United States Patent

Arai

[11] Patent Number: 5,316,646
[45] Date of Patent: May 31, 1994

[54] CONTROLLING APPARATUS FOR CONTINUOUS ELECTROLYTIC ION WATER PRODUCING APPARATUS

[75] Inventor: Kazuyoshi Arai, Atsugi, Japan
[73] Assignee: Janix Kabushiki Kaisha, Japan
[21] Appl. No.: 944,439
[22] Filed: Sep. 14, 1992
[30] Foreign Application Priority Data
  Sep. 10, 1991 [JP] Japan .................... 3-289525
[51] Int. Cl.$^5$ ............................................. B01D 17/06
[52] U.S. Cl. ................................................. 204/306
[58] Field of Search ............... 204/305, 306, 152, 229
[56] References Cited
U.S. PATENT DOCUMENTS
  4,917,782 4/1990 Davies ................................. 204/306
  5,055,170 10/1991 Saito ................................... 204/228

*Primary Examiner*—John Niebling
*Assistant Examiner*—Brendan Mee
*Attorney, Agent, or Firm*—Lorusso & Loud

[57] ABSTRACT

A control apparatus which can control a continuous electrolytic ion water producing apparatus so that determination and indication of energization and electrolyzing capacity of an electrolytic cell and determination and indication of a life of a filter cartridge are performed appropriately. A control unit connected to a power source circuit of the electrolytic cell includes an electrolysis judging device which judges, based on a signal of a flow rate sensor and a signal of a range change-over switch whether or not an electrolyzing operation should be performed. When the electrolyzing judging device judges that an electrolyzing operation should be performed, a power source switch is turned on to cause the power source circuit to energize the electrolytic cell to perform an electrolyzing operation. On the contrary when it is judged that an electrolyzing operation should not be performed, the electrolysis judging device turns off the power source switch to put the electrolytic cell into a deenergized condition.

7 Claims, 3 Drawing Sheets

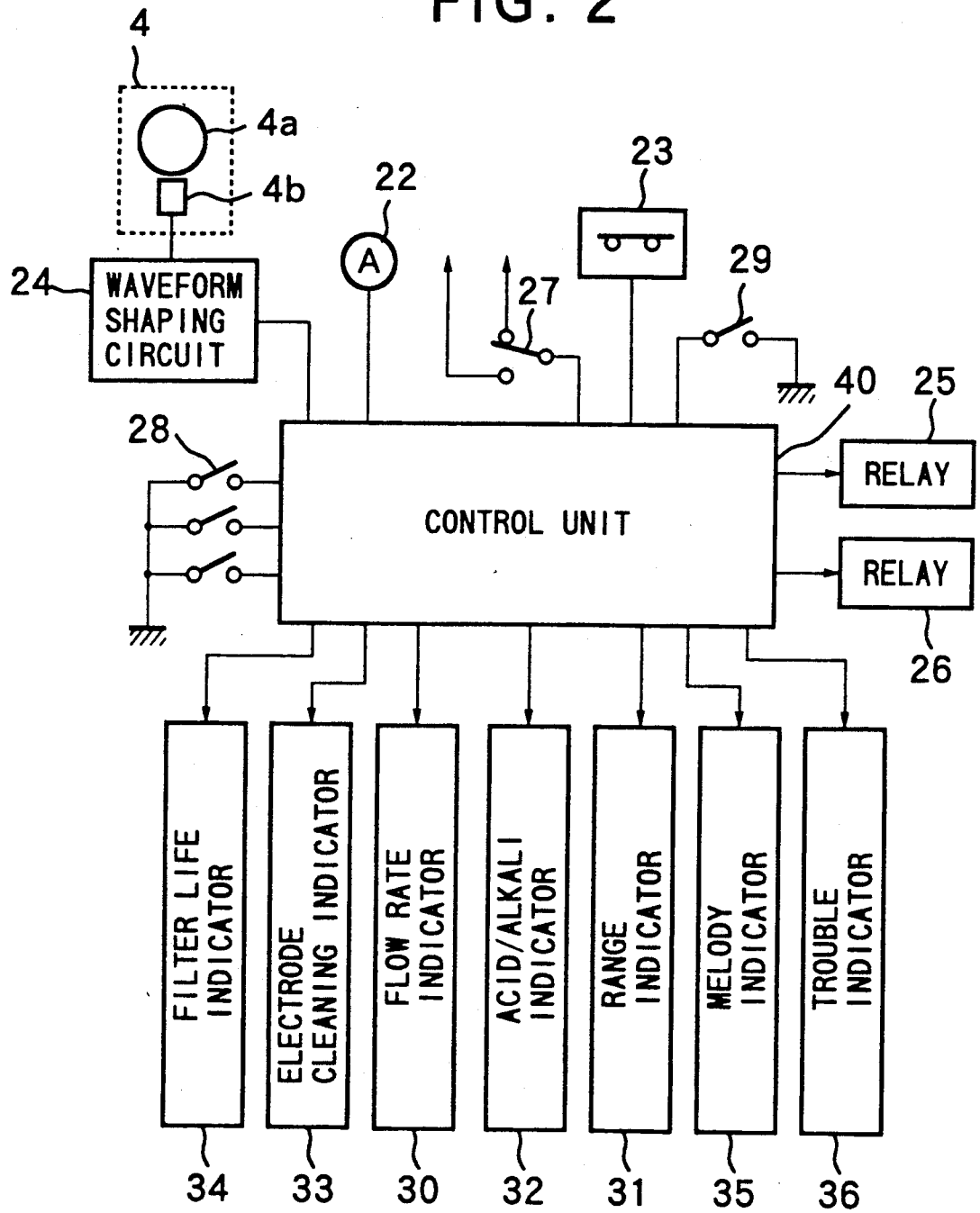

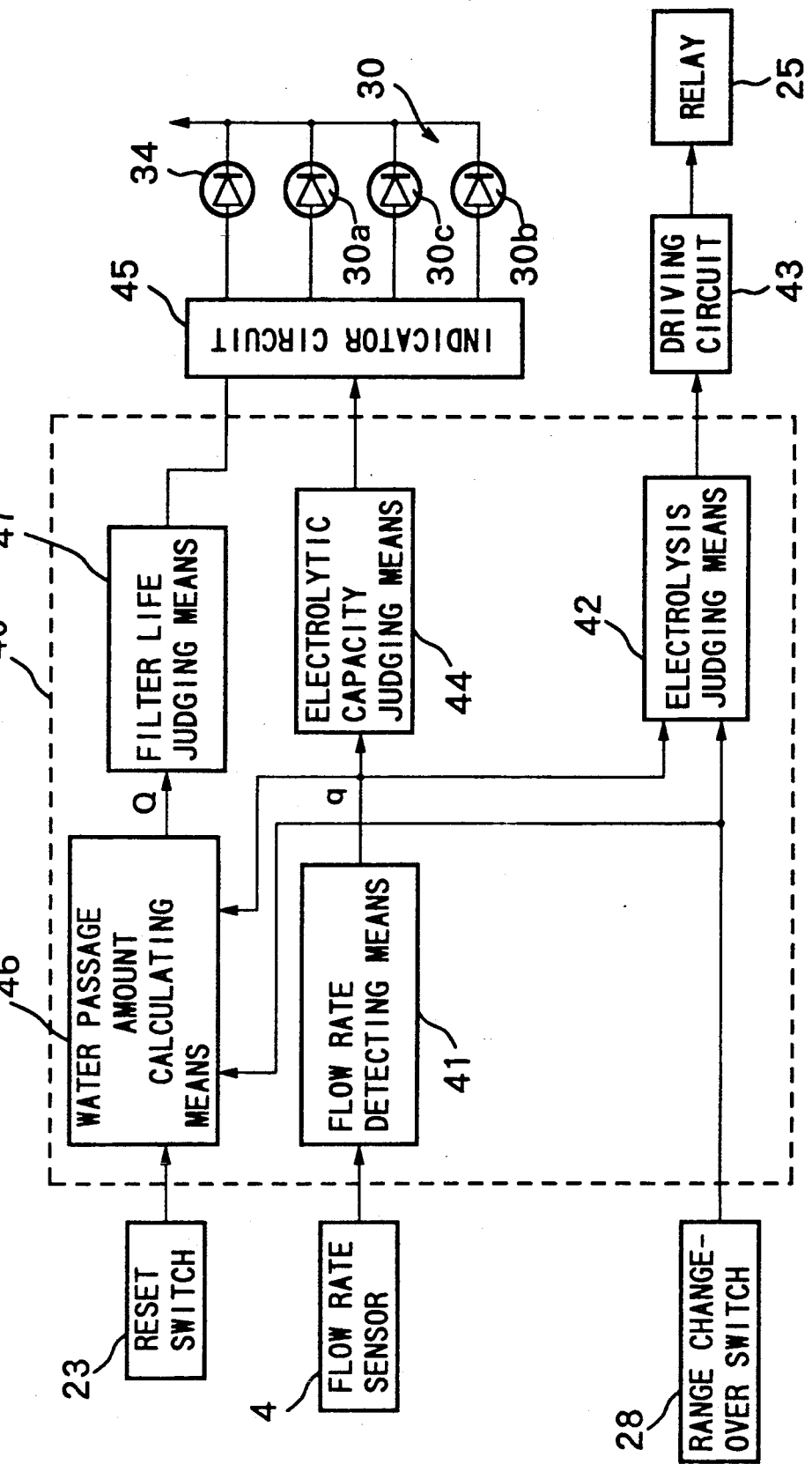

CONTROLLING APPARATUS FOR CONTINUOUS ELECTROLYTIC ION WATER PRODUCING APPARATUS

BACKGROUND OF THE INVENTION

1. Field of the Invention

This invention relates to a continuous electrolytic ion water producing apparatus which electrolyzes water such as city water to continuously produce alkali ion water and acid ion water, and more particularly to a controlling apparatus for a continuous electrolytic ion water producing apparatus of the type mentioned which performs determination and indication of energization and an electrolyzing capacity of an electrolytic cell, determination and indication of a life of a filter cartridge provided for removing residual chlorine from water and so forth.

2. Description of the Related Art

A continuous electrolytic ion water producing apparatus which applies a dc voltage between a pair of positive and negative electrodes in drinking water such as city water to electrolyze the drinking water to directly produce alkali ion water and acid ion water is already known. Alkali ion water is used to improve the acid condition resulting from modern eating habits depending upon meat and thereby promotes health while acid ion water is used to wash the surface of the human body and for make-up.

A conventional electrolytic ion water producing apparatus of the type mentioned is generally constructed such that, when water flows therethrough, a pressure switch detect whether or not water flows at more than a predetermined reference flow rate, and when water flows at more than the reference flow rate, an electrolytic cell is energized automatically to produce ion water. The electrolyzing capacity of the electrolytic cell increases as the flow rate decreases, and the hydrogen ion exponent (pH) of electrolytic ion water produced depends much upon the flow rate and so forth. Therefore, a range change-over switch for changing over the electrolyzing strength is provided such that a user operates, visually estimating a flow rate of ion water flowing into a glass, the range change-over switch to regulate the electrolyzing capacity. Further, while a filter cartridge for removing residual chlorine contained in city water is attached to an inlet pipe, the time of exchange of the filter cartridge, i.e. expiration of its useful life, is normally determined from the cumulative water passing time water passes through the filter cartridge.

With the conventional electrolytic ion water producing apparatus, however, a pressure switch is employed to detect a flow of water, and the pressure switch sometimes does not operate regularly in a region in which the pressure of city water is comparatively low or when a pipe line is partially damaged. Particularly in case the outlet port for ion water is choked, the electrolytic cell may be energized in error while water does not flow. Meanwhile, as regards regularization of the electrolyzing capacity, since measurement of the flow rate relies upon the sixth sense of a user, changing over of the range of the electrolyzing strength cannot be performed accurately, and when the quality of water changes and the change of the quality of water has an influence on the electrolyzing capacity, it is almost impossible to regularize the electrolyzing capacity. Further, since the determination of life of the filter cartridge depends upon the cumulative time for water passing a therethrough, differences may arise between the cumulative quantity of water actually used and the capacity of the filter due to differences in water flow among various homes, that is, from the difference in flow rate per unit time. Consequently, it is not possible to determine service life accurately in any case. Accordingly, a need exists to effectively solve the problems of the conventional electrolytic ion water producing apparatus described above.

A solution to the problems is disclosed, for example, in Japanese Utility Model Laid-Open Application No. 1-163494. According to the proposed solution, an electrolytic current supplied to an electrolytic cell is detected, and the magnitude of the electrolytic current is controlled so as to coincide with a value of a current set by selective operation of an electrolyzing strength adjusting switch.

With the proposed solution, however, since an electrolytic current is controlled in response to selection of the electrolyzing strength adjusting switch, such control is not available as to regularize the electrolyzing capacity in various conditions of use or to precisely determine and indicate life of a filter cartridge.

SUMMARY OF THE INVENTION

It is an object of the present invention to provide a controlling apparatus which can control a continuous electrolytic ion water producing apparatus so that determination and indication of energization and an electrolyzing capacity of an electrolytic cell and determination and indication of service life of a filter cartridge are performed appropriately.

In order to attain the above object, according to the present invention, there is provided a controlling apparatus for a continuous electrolytic ion water producing apparatus which includes an electrolytic cell, a pair of negative and positive electrodes accommodated in the electrolytic cell and a water pipe line for introducing water to the electrolytic cell. The controlling apparatus includes a filter cartridge disposed in the water pipe line for removing residual chlorine from the water passing through the water pipe line, a flow rate sensor disposed in the water pipe line for detecting the flow rate of water passing through the water pipe line, a power source circuit for applying a dc voltage between the negative and positive electrodes, a range change-over switch for adjusting the electrolyzing strength of the electrolytic cell, a power source switch for the power source circuit, and a control unit for judging whether or not an electrolyzing operation should be performed in response to flow rate detected by the flow rate sensor and the electrolyzing strength of the electrolytic cell, which is determined by the position of the range change-over switch. The power source switch is controlled in accordance with the judgment of the control unit.

In the controlling apparatus for a continuous electrolytic ion water producing apparatus, when water actually flows through the electrolytic cell, residual chlorine in the water is removed by the filter cartridge, and the flow rate is detected as a signal of the flow rate sensor. Thus, when a flow is detected as a signal of the flow rate sensor and the range change-over switch is at its electrolyzing position, the power source switch is turned on by the control unit so that the electrolytic cell is energized by the power source circuit to perform a regular electrolyzing operation. On the other hand, when no water flows and no flow rate is detected as a signal of the flow rate sensor, or when the range change-over switch is at its no-electrolyzing position, even if a flow is detected as a signal of the flow rate sensor, the power source switch is turned off by the control unit. Consequently, the electrolytic cell is thereafter kept in a deenergized condition. Thus, the electrolytic cell can be properly energized without being influenced by pressure of the water or damage to a water pipe line.

Preferably, the control unit includes water passage amount calculating means for totalizing flow rate to calculate a cumulative amount of water passage when water flows through the water pipe line, and filter life judging means for judging the life of the filter cartridge from the totalized water passage amount and indicating, when it is detected that the life of the filter cartridge has expired, such expiration of the life. Thus, the filter of the filter cartridge can be exchanged suitably in accordance with the capacity of the filter. The filter cartridge preferably includes a reset switch which resets the amount of the water passage totalized by the water passage amount calculating means when a filter is replaced. An error in determination of the life of the filter can thus be effectively prevented.

Preferably, the control unit includes electrolyzing capacity judging means for judging, when water flows through the water pipe line, an electrolyzing capacity flow rate detected by the flow rate sensor and indicating whether the flow rate is excessively high, excessively low or appropriate. Thus, the electrolyzing capacity of the electrolytic cell with respect to a flow rate can be judged accurately and hence optimized, and accordingly, the reliability of acid or alkali ion water obtained is enhanced. Further, when the quality of water changes the electrolyzing capacity of the electrolytic cell can be corrected appropriately taking the judgement of the electrolyzing capacity into consideration.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a schematic circuit diagram of an electric control system for the continuous electrolytic ion water producing apparatus shown in FIG. 1; and FIG. 3 is a block diagram of the controlling circuit of the controlling system shown in FIG. 2.

DETAILED DESCRIPTION OF THE PREFERRED EMBODIMENT

Figure 1:
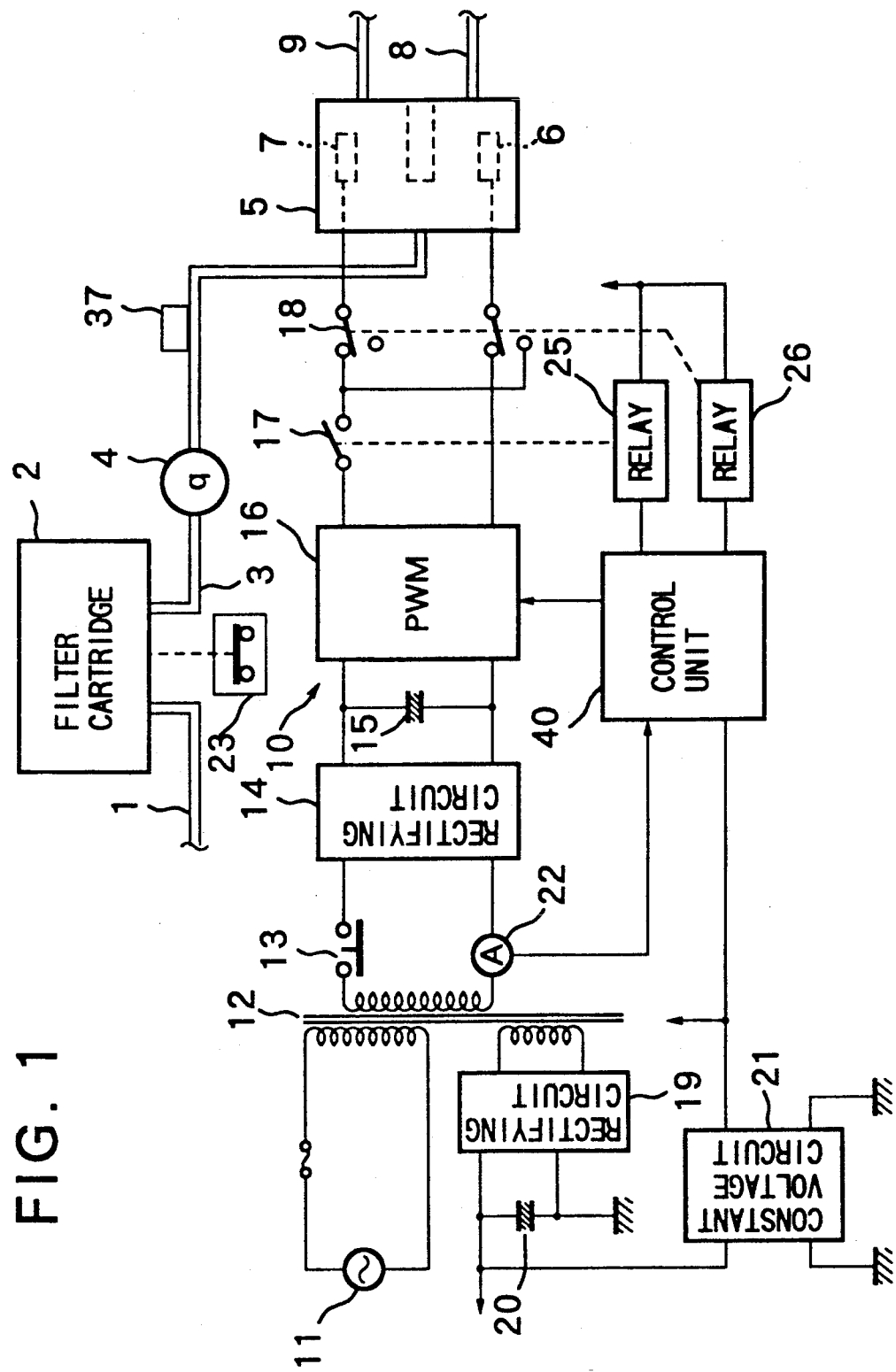
FIG. 1 is a circuit diagram schematically showing a water flow route and a power source circuit of a continuous electrolytic ion producing apparatus in which a controlling apparatus according to the present invention is incorporated.

Referring first to FIG. 1, there is shown a continuous electrolytic ion water producing apparatus in which a controlling apparatus according to the present invention is incorporated. The continuous electrolytic ion water producing apparatus shown includes an inlet pipe 1 serving as a water pipe adapted to be connected to a city water pipe or the like to introduce city water into the continuous electrolytic ion water producing apparatus. The inlet pipe 1 communicates with a filter cartridge 2 for removing residual chlorine from the city water. An outlet pipe 3 from the filter cartridge 2 communicates with an electrolytic cell 5 by way of a flow rate sensor 4 of the rotary type interposed between them. The electrolytic cell 5 is of the enclosed type, and the exit side of the interior is partitioned by a partition or the like into two sections in which a negative electrode 6 and a positive electrode 7 are disposed separately. An outlet pipe 8 for alkali ion water is connected to the electrolytic cell 5 adjacent the negative electrode 6 while another outlet pipe 9 for acid ion water is connected to the electrolytic cell 5 adjacent the positive electrode 7 so that alkali ion water and acid ion water can be extracted separately from the output pipes 8 and 9, respectively.

A power source circuit 10 is provided for the electrolytic cell 5 and includes an AC power source 11 connected to the primary winding of a power source transformer 12, a secondary winding of which is connected to a rectifying circuit 14 by way of a bimetal thermostat 13 for the prevention of overheating. The positive and negative poles of the DC voltage output side of the rectifying circuit 14 are connected by way of a smoothing capacitor 15 to a switching regulator 16 of the pulse width modulating type (PWM) for controlling the DC voltage. The outputs of the switching regulator 16 are connected individually to the positive electrode 7 and the negative electrode 6 by way of a power source switch 17 and a polarity reversing switch 18. For controlling power, another secondary winding of the power source transformer 12 is connected by way of another rectifying circuit 19 and another smoothing capacitor 20 to a constant voltage circuit 21, which is connected to a control unit 40 so that a fixed voltage may be supplied to the control unit 40.

Referring now to FIG. 2, there is shown an electric control system for the continuous electrolytic ion water producing apparatus shown in FIG. 1. Referring also to FIG. 1, a current sensor 22 for detecting an electrolytic current is provided at the secondary winding of the power source transformer 12 connected to the rectifying circuit 14, and an output signal of the current sensor 22 is input to the control unit 40. A reset switch 23 is provided for the filter cartridge 2 and resets upon exchanging of a filter, and a switch signal of the reset switch 23 is input to the control unit 40. The flow rate sensor 4 detects rotation of an electromagnetic vane wheel 4a disposed in the water pipe line by means of a Hall effect element 4b and outputs corresponding pulses. The pulse signal is input to the control unit 40 by way of a waveform shaping circuit 24. The control unit 40 counts pulses of the pulse signal from the flow rate sensor 4 to detect a flow rate of water, and the power source switch 17 is switched on and off by means of a relay 25 in response to the flow rate thus detected. Further, after stopping water flow, a scale removing time is set in accordance with the amount of water passed, and the polarity reversing switch 18 is changed over to the opposite connecting position by means of another relay 26 in accordance with the scale removing time set to automatically remove scale from the positive and negative electrodes 7 and 6.

Further connected to the control unit 40 are an acid-alkali change-over switch 27 which is operated to select acid ion water or alkali ion water, a range change-over switch 28 for adjusting the electrolyzing strength, and a melody switch 29 which is manually operated when acid ion water is to be used. The electric control system further includes, as indicating means in the form of LEDs (light emitting diodes), a flow rate indicator 30, a range indicator 31, an acid/alkali indicator 32, an electrode cleaning indicator 33 which indicates that scale should be removed, a filter life indicator 34, a melody indicator 35 which gives a warning to inhibit drinking the water when acid ion water is selected and a trouble indicator 36 which indicates that the power source transformer 12 has overheated, all connected to the control unit 40.

Referring now to FIG. 3, there is shown a control circuit of the electric control system shown in FIG. 2. The control unit 40 includes flow rate detecting means 41 for receiving a pulse signal from the flow rate sensor 4. The flow rate detecting means 41 detects a flow rate q and outputs the flow rate q as a corresponding number of pulses to electrolysis judging means 42. The electrolysis judging means 42 compares the thus received flow rate q with a preset reference flow rate and outputs, when the flow rate q is lower than the reference flow rate, an off signal to the relay circuit 25 by way of a driving circuit 43. When the range change-over switch 28 is at its electrolyzing position and the flow rate q is equal to or higher than the reference flow rate, the electrolysis judging means 42 outputs an on signal. The pulse number of the flow rate q is input to electrolyzing capacity judging means 44 which judges electrolyzing capacity in accordance with the magnitude of the flow rate q. In particular, when the flow rate q is equal to or higher than a first preset value, a lighting signal is output to a high flow rate indicator 30a of the flow rate indicator 30 by way of a indicator circuit 45 when the flow rate q is equal to or lower than a second preset value, a lighting signal is output to a low flow rate indicator 30b of the flow rate indicator 30. On the other hand, when the flow rate q is between the two preset values, it is judged that the electrolyzing capacity is appropriate, and a lighting signal is output to a flow rate indicator 30c.

Further, the signals of the flow rate q, range change-over switch 28 and reset switch 23 are inputted to water passage amount calculating means 46 which totalizes the flow rate q for a period of time until a rest signal is input thereto in both of the electrolyzing and non-electrolyzing ranges, to calculate a cumulative water passage amount Q. The cumulative water passage amount Q is input to filter life judging means 47, which outputs, when the water passage amount Q approaches a preset value, a blinking signal to the filter life indicator 34 by way of the indicator circuit 45. But, when the cumulative water passage amount Q exceeds the preset value and the expiration of the life of the filter is thus determined, a lighting signal is output to the filter life indicator 34.

In operation, city water is normally introduced into the electrolytic cell 5 by way of the inlet pipe 1. A fixed voltage is supplied to the control unit 40 from the constant voltage circuit 21 connected to the rectifying circuit 19 on the secondary winding side of the power source transformer 12 so that the control unit 40 can execute its controlling operation. Thus, when neither alkali ion water acid ion water is to be used, no pulse signal is input from the flow rate sensor 4 to the control unit 40. Consequently, the electrolysis judging means 42 judges electrolyzing operation is at rest and outputs an off signal to the relay 25. Consequently, the power switch 17 is turned off by the relay 25 thereby to deenergize the electrolytic cell 5 and establish a non-electrolyzing state.

Then, when water is allowed to pass through the continuous electrolytic ion water producing apparatus, city water passes through the filter cartridge 2, by which residual chlorine in the city water is removed, and the city water then flows into the electrolytic cell 5. Thereupon, a pulse signal from the flow rate sensor 4 is inputted to the flow rate detecting means 41 of the control unit 40 which detects flow rate q. Then, in case the range change-over switch 28 is at its non-electrolyzing position, a non-electrolyzing operation is determined by the electrolytic judging means 42 similarly as described above. Consequently, the electrolytic cell 5 remains in the non-electrolyzing condition wherein the city water, from which chlorine has been removed, is obtained from the continuous electrolytic ion water producing apparatus.

During such non-electrolyzing operation and during electrolyzing operation which will be hereinafter described, the flow rate q is totalized by the water passage amount calculating means 46 to obtain a cumulative water passage amount Q, and whether or not the life of the filter has expired is judged precisely based on the cumulative water passage amount Q by the filter life judging means 47. Then, when the expiration of the life of the filter is determined, the indicator 34 therefor first blinks and then is lit to indicate the expiration of the life of the filter, that is, to indicate that the time to replace the filter has arrived. Consequently, the user can suitably exchange the filter cartridge 2. Then, when a new filter cartridge 2 is set in position, the reset switch 23 is operated so that a reset signal is input to the water passage amount calculating means 46. Consequently, the cumulative water passage amount Q is thereafter accumulated, beginning with zero again, by the water passage amount calculating means 46.

On the other hand, if, upon passage of water, the range change-over switch 28 is manually set at a predetermined electrolyzing strength range position, an electrolyzing operation is determined by the electrolysis judging means 42, and an on signal is output to the relay 25 so that the power source switch 17 is switched on by the relay 25. Consequently, the transformed voltage on the secondary winding side of the power source transformer 12 is converted into a DC voltage by the rectifying circuit 14, smoothed by the smoothing capacitor 15 and input to the switching regulator 16. In this instance, the control unit 40 sets a pulse width in response to the position of the range change-over switch 28, and a pulse signal having the set pulse width is output to the switching regulator 16. Consequently, the switching regulator 16 switches on and off to variably control the DC supply voltage, whereby an electrolyzing voltage corresponding to the position of the range change-over switch 28 is output from the switching regulator 16. Thus, the predetermined electrolyzing voltage is applied between the positive and negative electrodes 7 and 6 of the electrolytic cell 5 by way of the power source switch 17 and the polarity reversing switch 18 in its regularly connecting position so that city water of the electrolytic cell 5 is electrolyzed at an electrolyzing strength corresponding to the electrolyzing voltage. Thus, if the polarity on the electrode side is changed over by the polarity reversing switch 18 to the outlet pipe 8 on the negative electrode 6 side, then alkali ion water containing a comparatively greater amount of negative ions is obtained, but on the contrary if the polarity is changed over to the outlet pipe 9 on the positive electrode 7 side, then acid ion water containing a comparatively greater amount of positive ions is obtained.

During such electrolyzing operation, electrolyzing capacity is judged in accordance with the magnitude of the flow rate q by the electrolyzing capacity judging means 44, and when the flow rate q is excessively high, excessively low or proper, the appropriate indicator 30a, 30b or 30c is lit in response to a lighting signal. Thus, the flow rate q will be adjusted in accordance with the thus lit condition of the indicator 30a, 30b or 30c observed by the user so that appropriately electrolyzed acid or alkali ion water can always be obtained. On the other hand, when the quality of water changes, the electrolyzing strength range or the flow rate q may be adjusted to compensate for the difference of the quality of water and to optimize the electrolyzing capacity. It is to be noted that acid ion water or alkali ion water obtained then and the range change-over condition are individually indicated, and a melody indication is provided, when acid ion water is output, to give a warning not to drink the water.

Having now fully described the invention, it will be apparent to one of ordinary skill in the art that many changes and modifications can be made thereto without departing from the spirit and scope of the invention as set forth herein.

What is claimed is:

1. A control apparatus for controlling a continuous electrolytic ion water producing apparatus which includes an electrolytic cell, a pair of negative and positive electrodes accommodated in said electrolytic cell, a water pipe line for introducing water to said electrolytic cell and a filter cartridge disposed in said water pipe line for removing residual chlorine from water passing through said water pipe line, said control apparatus comprising:

a flow rate sensor disposed in the water pipe line for detecting flow rate of water passing through the water pipe line;
   a power source circuit for applying a DC voltage between the negative and positive electrodes;
   a range change-over switch for selecting said DC voltage;
   a power source switch for said power source circuit; and
   control means for judging whether or not an electrolyzing operation should be performed on the basis of the flow rate detected by said flow rate sensor and said selected DC voltage and for controlling said power source switch in accordance with the judgement, said control means comprising water flow totalizing means for determining a cumulative amount of water passed through the water pipe line, and filter life judging means for judging the remaining useful service life of the filter cartridge from said cumulative amount of water.

2. A control apparatus for a continuous electrolytic ion water producing apparatus according to claim 1, wherein said control means further comprises electrolyzing capacity judging means for determining electrolyzing capacity, based on the flow rate detected by said flow rate sensor, and for comparing said detected flow rate with predetermined values for high and low flow rates, said control apparatus further comprising indicating means for providing a visible indication of whether the detected flow rate is excessively high, excessively low or appropriate in accordance with the comparison.

3. A control apparatus for a continuous electrolytic ion water producing apparatus according to claim 1, wherein the filter cartridge includes a reset switch which resets to zero the determined cumulative amount of water when a filter cartridge is replaced.

4. A control apparatus according to claim 1 wherein said filter life judging means determines expiration of the useful service life of said filter cartridge by comparing said cumulative amounts of water with a predetermined value.

5. A control apparatus according to claim 1 further comprising a visual indicator for visually signalling need to replace said filter cartridge responsive to a signal from said filter life judging means.

6. A control apparatus according to claim 1 further comprising a visual indicator for visually indicating need to replace said filter cartridge, and
   wherein said filter life judging means determines expiration of the useful service life of said filter cartridge by comparing said cumulative amount of water with a predetermined value.

7. A control apparatus according to claim 6 wherein said visual indicator is a light which blinks as said cumulative amount of water approaches said predetermined value and is constantly illuminated when said cumulative amount of water has exceeded said predetermined value.

* * * * *

UNITED STATES PATENT AND TRADEMARK OFFICE
CERTIFICATE OF CORRECTION

PATENT NO. : 5,316,646
DATED : May 31, 1994
INVENTOR(S) : Kazuyoshi ARAI

It is certified that error appears in the above-indentified patent and that said Letters Patent is hereby corrected as shown below:

Col. 1, line 33, delete "detect" and insert --detects--;

line 50, delete "water passing".

Col. 2, line 1, delete "a".

Col. 5, line 34, after "45" insert --and--;

line 64, after "water" insert --or--.

Signed and Sealed this

Fourth Day of April, 1995

Attest:

BRUCE LEHMAN

Attesting Officer

Commissioner of Patents and Trademarks